United States Patent
Jung et al.

(10) Patent No.: US 11,476,047 B2
(45) Date of Patent: Oct. 18, 2022

(54) MULTILAYER ELECTRONIC COMPONENT

(71) Applicant: SAMSUNG ELECTRO-MECHANICS CO., LTD., Suwon-si (KR)

(72) Inventors: Woong Do Jung, Suwon-si (KR); Yu Hong Oh, Suwon-si (KR); Kyung Ryul Lee, Suwon-si (KR); Kun Ho Koo, Suwon-si (KR); Young Soo Yi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 6 days.

(21) Appl. No.: 17/320,958

(22) Filed: May 14, 2021

(65) Prior Publication Data

US 2022/0122770 A1 Apr. 21, 2022

(30) Foreign Application Priority Data

Oct. 20, 2020 (KR) .......................... 10-2020-0136191

(51) Int. Cl.
*H01G 4/008* (2006.01)
*H01G 4/30* (2006.01)
*H01G 4/12* (2006.01)

(52) U.S. Cl.
CPC .............. *H01G 4/008* (2013.01); *H01G 4/12* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 2011/0149470 A1* | 6/2011 | Hur | H01G 4/12 29/25.42 |
| 2016/0268046 A1 | 9/2016 | Nishisaka et al. | |
| 2019/0157003 A1* | 5/2019 | Mun | H01G 4/2325 |
| 2020/0066454 A1* | 2/2020 | Cha | H01G 4/0085 |
| 2020/0411248 A1* | 12/2020 | Hashimoto | H01G 4/248 |
| 2022/0122770 A1* | 4/2022 | Jung | H01G 4/0085 |

(Continued)

FOREIGN PATENT DOCUMENTS

| | | |
|---|---|---|
| EP | 0 777 242 A2 | 6/1997 |
| KR | 10-0202500 B1 | 6/1999 |
| KR | 10-2011-0072398 A | 6/2011 |

(Continued)

*Primary Examiner* — Dion R. Ferguson
(74) *Attorney, Agent, or Firm* — Morgan, Lewis & Bockius LLP

(57) ABSTRACT

A multilayer electronic component includes a body in which internal electrodes including Ni and Sn and dielectric layers are alternately disposed, and external electrodes disposed on a surface of the body, connected to the internal electrodes, and including Cu and Sn, wherein the internal electrodes include an alloy including Ni, Cu, and Sn in a region in contact with the external electrodes, and Sn in an amount that satisfies the following formula: $1<C2/C1<13.5$ in which C1 is the content of Sn of the internal electrodes at a central portion of the body and C2 is the content of Sn of the internal electrodes at a point 2 μm away from a point at which the internal electrode and the external electrode are in contact with each other in an inward direction of the body.

25 Claims, 8 Drawing Sheets

(56) References Cited

U.S. PATENT DOCUMENTS

2022/0139630 A1\* 5/2022 Yamada .............. C04B 35/4682
　　　　　　　　　　　　　　　　　　　　　　　361/321.2
2022/0208471 A1\* 6/2022 Song ...................... H01G 4/008

FOREIGN PATENT DOCUMENTS

| KR | 10-2016-0110123 A | 9/2016 | | |
| WO | WO-2014024538 A1 \* | 2/2014 | ............. | H01G 13/00 |
| WO | WO-2015016309 A1 \* | 2/2015 | ............. | H01G 4/008 |

\* cited by examiner

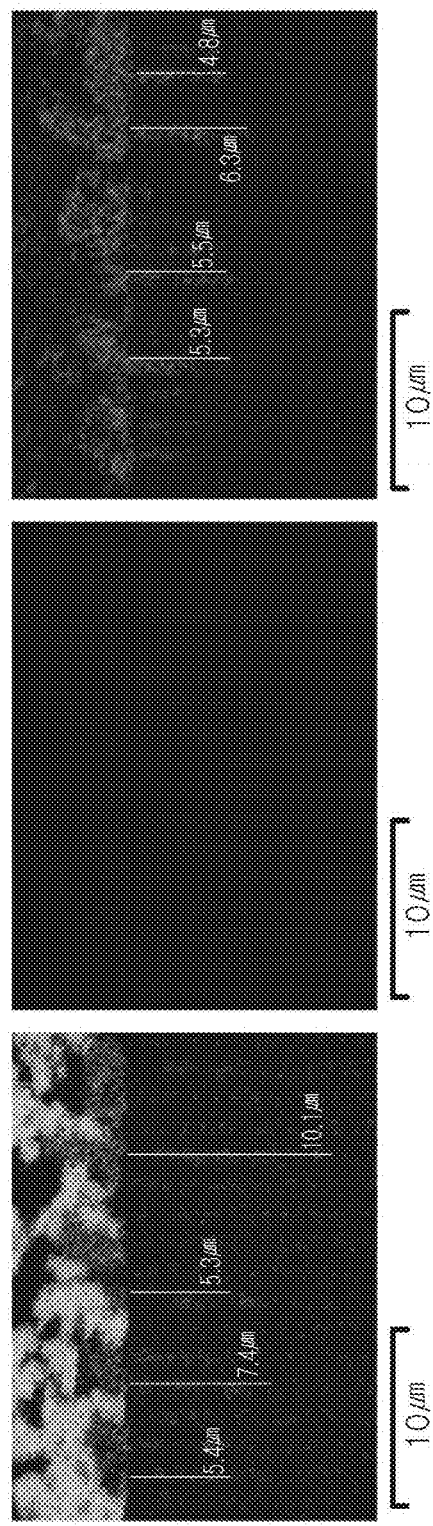

MULTILAYER ELECTRONIC COMPONENT

CROSS-REFERENCE TO RELATED APPLICATION

This application claims benefit of priority to Korean Patent Application No. 10-2020-0136191 filed on Oct. 20, 2020 in the Korean Intellectual Property Office, the disclosure of which is incorporated herein by reference in its entirety.

BACKGROUND

1. Field

The present disclosure relates to a multilayer electronic component.

2. Description of Related Art

A multilayer ceramic capacitor (MLCC), a ceramic electronic component, is a chip type condenser mounted on the printed circuit board (PCB) of various types of electronic products such as display devices including a liquid crystal display (LCD), a plasma display panel (PDP), and the like, computers, smartphones, cellular phones, and the like, to charge or discharge electricity.

Such an MLCC having advantages such as compactness, guaranteed high capacitance, and ease in the mounting thereof may be used as a component of various electronic devices. As various electronic devices such as computers, mobile devices, and the like, have become smaller and higher in terms of power output, demand for miniaturization and higher capacitance of multilayer ceramic capacitors are increasing.

In addition, as industry interest in electric parts for automobiles has recently increased, MLCCs are also required to have high reliability and high strength characteristics in order to be used in automobile or infotainment systems.

Ni is mainly used as an internal electrode material of multilayer ceramic capacitors. However, in the case of using only Ni as an internal electrode material, corrosion may occur in a region in which internal electrodes and external electrodes are in contact with each other due to a plating solution introduced from the external electrodes during plating, resulting in chip deterioration.

SUMMARY

Exemplary embodiments provide a multilayer electronic component having excellent moisture resistance reliability.

Exemplary embodiments provide a multilayer electronic component in which incidence of cracking is suppressed.

Exemplary embodiments provide a multilayer electronic component having improved capacitance.

According to an exemplary embodiment, a multilayer electronic component includes: a body in which internal electrodes including Ni and Sn and dielectric layers are alternately disposed; and external electrodes disposed on a surface of the body, connected to the internal electrodes, and including Cu and Sn, wherein the internal electrodes include an alloy including Ni, Cu, and Sn (Ni—Cu—Sn alloy) in a region thereof in contact with the external electrodes, and Sn in an amount that satisfies the following formula: $1<C2/C1<13.5$ in which C1 is the content (at %) of Sn included in the internal electrodes at a central portion of the body, and C2 is the content (at %) of Sn included in the internal electrodes at a point 2 μm away from a point at which the internal electrode and the external electrode are in contact with each other in an inward direction of the body, wherein the content of Sn is based on the total amount of the components included in the internal electrodes.

According to an exemplary embodiment, a multilayer electronic component includes: a body in which internal electrodes including Ni and Sn and dielectric layers are alternately disposed; and external electrodes disposed on a surface of the body, connected to the internal electrodes, and including Cu and Sn, wherein the internal electrodes include an alloy including Ni, Cu, and Sn (Ni—Cu—Sn alloy) in a region in contact with the external electrodes, and 5 at % or more of Sn in a region having a length of 5 μm to 10 μm from the at which the internal electrode and the external electrode are in contact with each other in an inward direction of the body.

BRIEF DESCRIPTION OF DRAWINGS

The above and other aspects, features and other advantages of the present disclosure will be more clearly understood from the following detailed description taken in conjunction with the accompanying drawings, in which:

FIG. 7A is an image of (a) a Cu element, FIG. 7B is an image of (b) an Ni element, and FIG. 7C is an image of (c) a Sn element observed in a region in which an internal electrode is in contact with an external electrode using an SEM-EDX when the external electrode is formed using an external electrode conductive paste to which 10 wt % of Sn is added.

DETAILED DESCRIPTION

Figure 1:
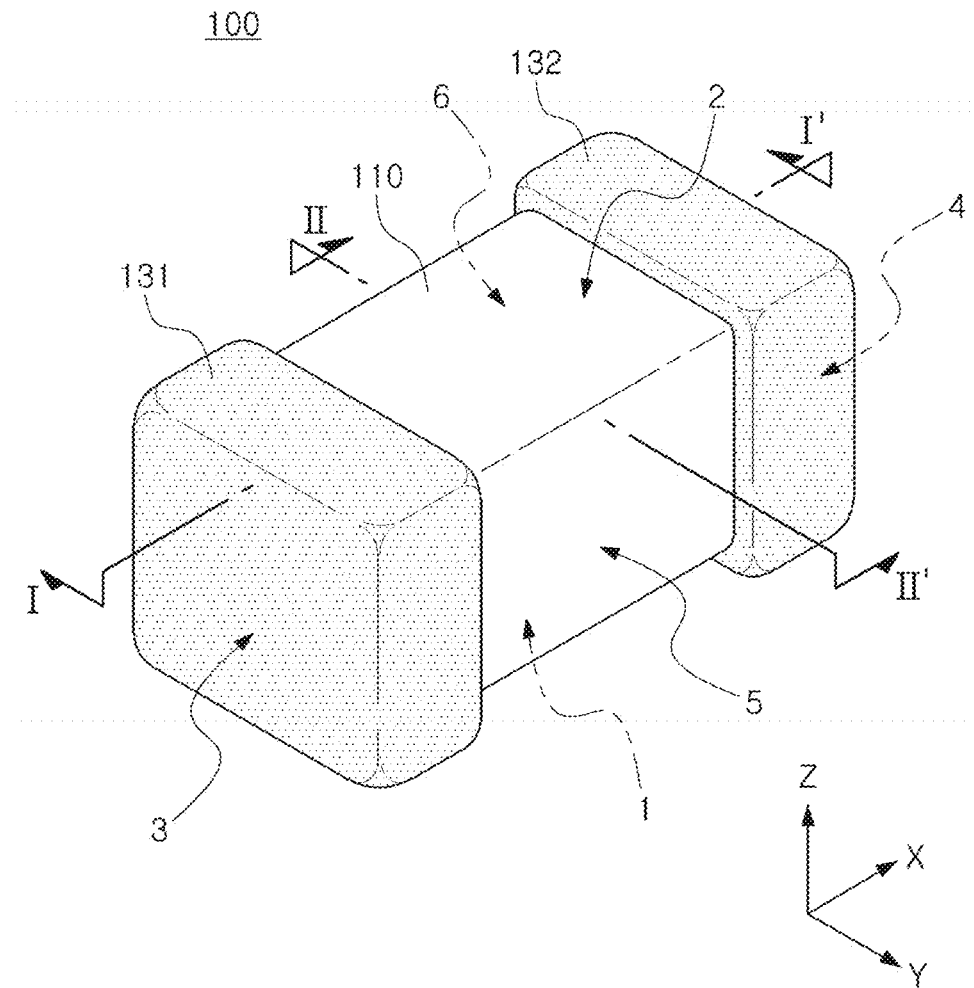
FIG. 1 is a schematic perspective view of a multilayer electronic component according to an exemplary embodiment in the present disclosure.

Hereinafter, exemplary embodiments in the present disclosure will be described in detail with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least an example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, and may include changes in shape occurring during manufacturing.

The features of the examples described herein may be combined in various manners, as will be apparent after gaining an understanding of the disclosure of this application. Further, although the examples described herein have a variety of configurations, other configurations are possible, as will be apparent after an understanding of the disclosure of this application.

In the drawings, X direction may be defined as a second direction, L direction, or the length direction, Y direction may be defined as a third direction, a W direction, or a width direction, and Z direction may be defined as a first direction, a stacking direction, a T direction, or a thickness direction.

Multilayer Electronic Component

Figure 2A:
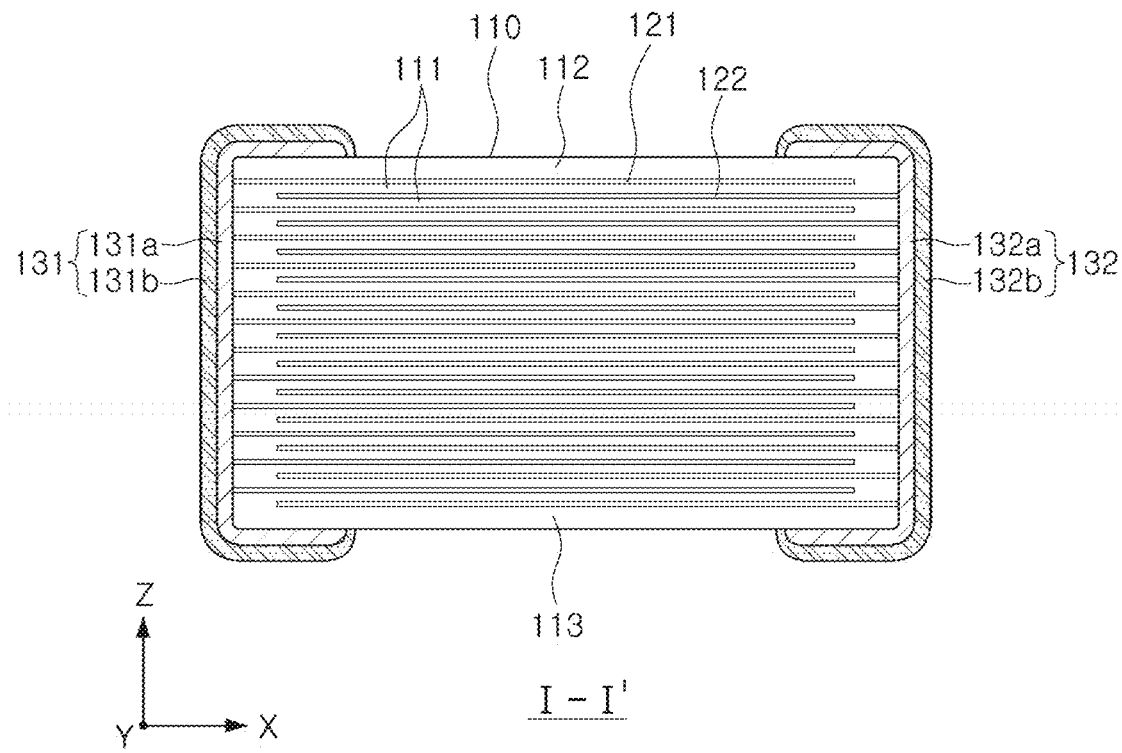
FIG. 2A is a cross-sectional view taken along line I-I' of FIG. 1.

FIG. 1 is a schematic perspective view of a multilayer electronic component according to an exemplary embodiment in the present disclosure;

FIG. 2A is a cross-sectional view taken along line I-I' of FIG. 1.

Figure 2B:
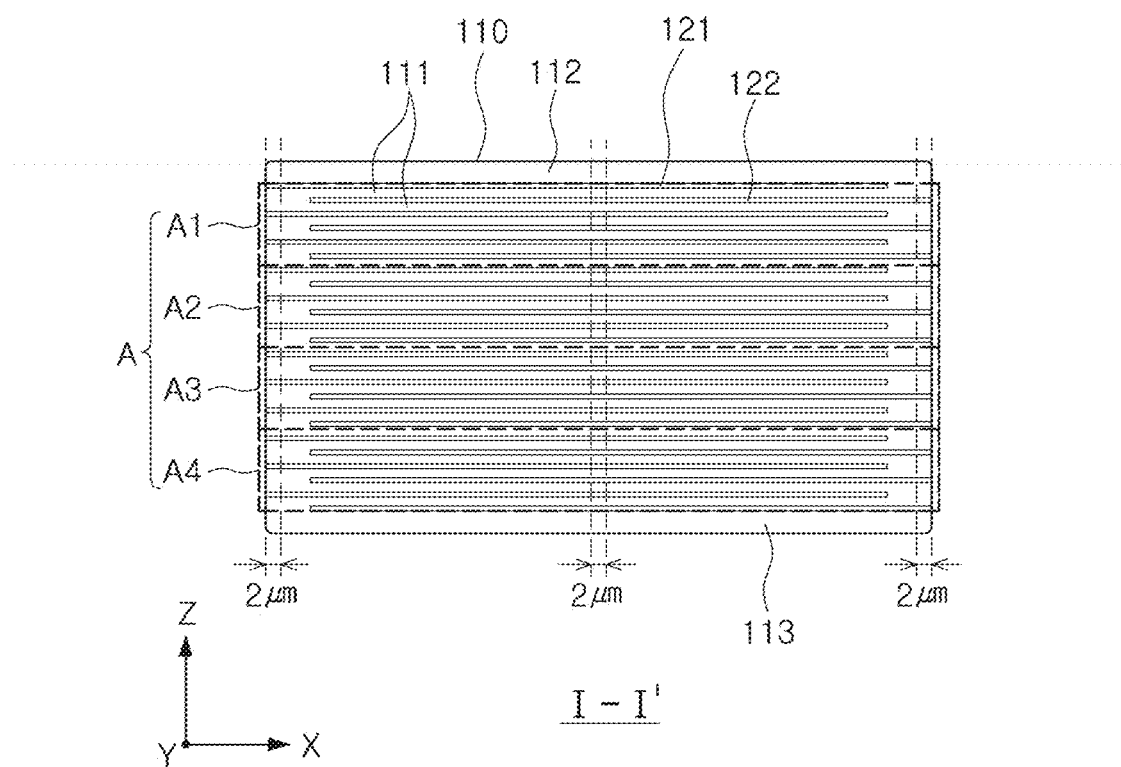
FIG. 2B is a view illustrating a position in the body of FIG. 2A to measure an element content of an internal electrode.

FIG. 2B is a view illustrating a position in the body of FIG. 2A to measure an element content of an internal electrode.

Figure 3:
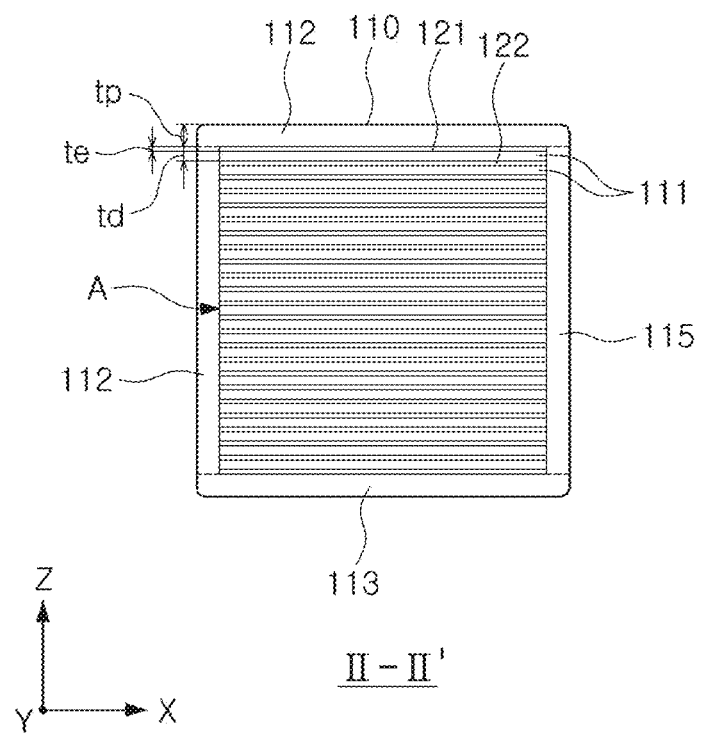
FIG. 3 is a cross-sectional view taken along line II-II' of FIG. 1.

FIG. 3 is a cross-sectional view taken along line II-II' of FIG. 1.

Figure 4:
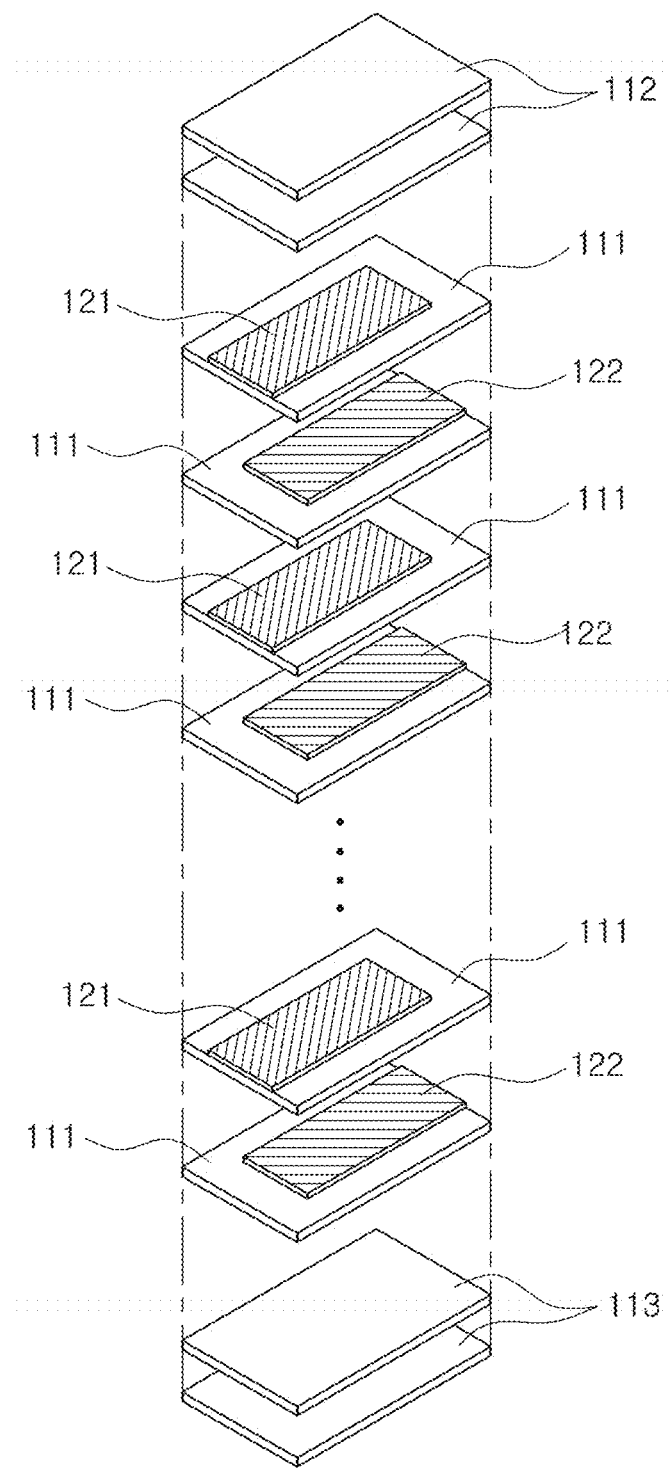
FIG. 4 is an exploded perspective view schematically illustrating a body in which a dielectric layer and an internal electrode are stacked according to an exemplary embodiment in the present disclosure.

FIG. 4 is an exploded perspective view schematically illustrating a body in which a dielectric layer and an internal electrode are stacked according to an exemplary embodiment in the present disclosure.

Hereinafter, a multilayer electronic component 100 according to an exemplary embodiment in the present disclosure will be described with reference to FIGS. 1 through 4.

A multilayer electronic component 100 according to an exemplary embodiment in the present disclosure includes: a body 110 in which internal electrodes 121 and 122 including Ni and Sn and dielectric layers 111 are alternately disposed; and external electrodes 131 and 132 disposed on a surface of the body 110, connected to the internal electrodes, and including Cu and Sn, wherein the internal electrodes 121 and 122 include a Ni—Cu—Sn alloy in a region thereof in contact with the external electrodes 131 and 132, and an amount of Sn included in the internal electrodes satisfies the following formula: $1<C2/C1<13.5$ in which C1 is atom % of Sn included in the internal electrodes 121 and 122 at a central portion of the body and C2 is atom % of Sn included in the internal electrodes 121 and 122 at a point 2 μm away from a point at which the internal electrode and the external electrode are in contact with each other in an inward direction of the body, wherein the content of Sn is based on the total amount of the components included in the internal electrodes.

In the body 110, the dielectric layer 111 and the internal electrodes 121 and 122 are alternately laminated.

There is no particular limitation on a specific shape of the body 110 but, as shown, the body 110 may have a hexahedral shape or a shape similar thereto. Due to contraction (or shrinkage) of ceramic powder particles included in the body 110 during a firing process, the body 110 may have a substantially hexahedral shape, but may not have a hexahedral shape with perfectly straight lines.

The body 110 may have first and second surfaces 1 and 2 opposing each other in the thickness direction (Z direction), third and fourth surfaces 3 and 4 connected to the first and second surfaces 1 and 2 and opposing each other in the width direction (Y direction), and fifth and sixth surfaces 5 an 6 connected to the first and second surfaces 1 and 2, connected to the third and fourth surfaces 3 and 4, and opposing each other in the length direction (X direction).

A plurality of dielectric layers 111 forming the body 110 are in a sintered state, and adjacent dielectric layers 111 may be integrated such that boundaries therebetween may not be readily apparent without using a scanning electron microscope (SEM).

According to an embodiment of the present disclosure, a raw material for forming the dielectric layer 111 is not limited as long as sufficient electrostatic capacitance can be obtained therewith. For example, a barium titanate-based material, a lead composite perovskite-based material, or a strontium titanate-based material may be used. The barium titanate-based material may include $BaTiO_3$-based ceramic powder particles, and the ceramic powder particles may include $BaTiO_3$ and $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1$ and $0<y<1)$, or $Ba(Ti_{1-y}Zr_y)O_3$ $(0<y<1)$ obtained by partially dissolving calcium (Ca), zirconium (Zr), and the like in $BaTiO_3$.

As a material for forming the dielectric layer 111, various ceramic additives, organic solvents, binders, dispersants, etc. may be added to the powder particles such as barium titanate ($BaTiO_3$) according to purpose in the present disclosure.

The dielectric layer 111 may be formed by adding various ceramic additives, organic solvents, binders, dispersants, and the like, to powder particles such as barium titanate ($BaTiO_3$), and the like, according to the purpose of the present disclosure.

Meanwhile, a thickness td of the dielectric layer 111 may not be limited.

However, in general, if the dielectric layer is formed to be thin with a thickness less than 0.6 μm, in particular, if the thickness of the dielectric layer is 0.41 μm or less, moisture resistance reliability may decrease.

As described below, when the Sn content of each position of the internal electrode is controlled according to an exemplary embodiment, moisture resistance reliability may be effectively improved even when the dielectric layer and the internal electrode are very thin, so that sufficient moisture resistance reliability may be ensured even when the thickness of the dielectric layer is 0.41 μm or less.

Therefore, when the thickness of the dielectric layer 111 is 0.41 μm or less, the effect of improving moisture resistance reliability according to the present disclosure may be more remarkable.

The thickness td of the dielectric layer 111 may refer to an average thickness of the dielectric layer 111 disposed between the first and second internal electrodes 121 and 122.

The average thickness of the dielectric layer 111 may be measured by scanning an image of a length-thickness (L-T) directional cross-section of the body 110 with a scanning electron microscope (SEM).

For example, regarding a certain dielectric layer extracted from an image of the length-thickness (L-T) directional cross-section taken in a central portion of the body 100 in the width direction with the SEM, thicknesses thereof may be measured at 30 points at equal intervals in the length direction, and an average value thereof may be calculated.

The thicknesses measured at 30 equally spaced points may be measured at a capacitance forming portion A.

The body 110 may include the capacitance forming portion A formed inside the body 110 and forming capacitance with the first internal electrode 121 and the second internal electrode 122 disposed to face each other with the dielectric layer 111 interposed therebetween and cover portions 112 and 113 formed above and below the capacitance forming portion A.

In addition, the capacitance forming portion A is an element contributing to the formation of capacitance of the capacitor, which may be formed by repeatedly stacking a plurality of first and second internal electrodes 121 and 122 with the dielectric layer 111 interposed therebetween.

The upper cover portion 112 and the lower cover portion 113 may be formed by stacking a single dielectric layer or two or more dielectric layers on upper and lower surfaces of the capacitance forming portion A in the thickness direction, respectively, and may serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, a thickness of the cover portions 112 and 113 may not be limited. However, a thickness tp of the cover portions 112 and 113 may be 20 μm or less in order to more easily achieve miniaturization and high capacitance in the multilayer electronic component.

In addition, margin portions 114 and 115 may be disposed on side surfaces of the capacitance forming portion A.

The margin portions include a margin portion 114 disposed on the sixth surface 6 of the body 110 and a margin portion 115 disposed on the fifth surface 5 of the body 10. That is, the margin portions 114 and 115 may be disposed on both side surfaces of the ceramic body 110 in the width direction.

As shown in FIG. 3, the margin portions 114 and 115 may refer to a region between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region in which the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking (lamination) and subsequently stacking a single dielectric layer or two or more dielectric layers on both side surfaces of the capacitance forming portion A in the width direction.

The internal electrodes 121 and 122 may be alternately disposed with the dielectric layer 111.

The internal electrodes may include first and second internal electrodes 121 and 122. The first and second internal electrodes 121 and 122 may be alternately disposed to face each other with a dielectric layer 111 configuring the body 110 interposed therebetween and may be exposed to the third and fourth surfaces 3 and 4 of the body 100, respectively.

Referring to FIG. 2A, the first internal electrode 121 may be spaced apart from the fourth surface 4 and exposed to the third surface 3, and the second internal electrode 122 may be spaced apart from the third surface 3 and exposed to the fourth surface 4.

In this case, the first and second internal electrodes 121 and 122 may be electrically separated from each other by the dielectric layer 111 disposed therebetween.

Referring to FIG. 4, the body 110 may be formed by alternately stacking a ceramic green sheet on which the first internal electrode 121 is printed and a ceramic green sheet on which the second internal electrode 122 is printed and subsequently firing the green sheets.

The internal electrodes 121 and 122 may be stacked as 400 or more layers to implement a multilayer electronic component having high capacitance, but the present disclosure is not limited thereto.

The internal electrodes 121 and 122 of the present disclosure include Ni and Sn. In addition, the internal electrodes 121 and 122 of the present disclosure include a Ni—Cu—Sn alloy in a region in contact with the external electrodes 131 and 132, respectively.

Ni is a main component used for an internal electrode material of a multilayer ceramic capacitor. However, in the case of using only Ni as an internal electrode material, corrosion may occur in a region in which an internal electrode and an external electrode are in contact with each other due to a plating liquid introduced from the external electrode during a plating process, resulting in chip deterioration.

According to an exemplary embodiment, since the internal electrodes 121 and 122 include the Ni—Cu—Sn alloy in the region in contact with the external electrodes 131 and 132, respectively, a Ni corrosion phenomenon at the ends of the internal electrodes due to penetration of a plating solution that may occur during plating may be prevented. Accordingly, moisture resistance reliability may be improved.

In addition, Sn included in the internal electrodes 121 and 122 may suppress the aggregation and disconnection of the internal electrodes, playing a role of improving the capacitance of the multilayer electronic component.

Here, Cu of the Ni—Cu—Sn alloy included in the internal electrodes 121 and 122 may be Cu contained in a conductive paste for forming the external electrodes, which are diffused into the internal electrodes 121 and 122 during firing.

A diffusion coefficient of Cu is about 100 times greater than that of Ni at 660° C. to 730° C., and diffusion from Cu to Ni is mainly due to the difference in the diffusion coefficient. Accordingly, during the firing, Cu of the external electrodes 131 and 132 moves toward the internal electrodes through the region thereof in contact with the internal electrodes 121 and 122.

In addition, the internal electrodes 121 and 122 of the present disclosure include Sn. Sn included in the conductive paste used for forming the external electrodes also moves toward the internal electrodes through the region in contact with the internal electrodes during the firing. Accordingly, the Ni—Cu—Sn alloy may be disposed at the ends of the internal electrodes.

For example, the external electrodes 131 and 132 of the present disclosure may be formed of a conductive paste including Cu and Sn, and the internal electrodes 121 and 122 may be formed of a conductive paste for internal electrodes including Ni and Sn.

In the internal electrodes 121 and 122 of the present disclosure, the amounts of Sn included in the internal electrodes 121 and 122 satisfies the following formula: $1<C2/C1<13.5$ in which C1 is the content (at %) of Sn included in the internal electrodes at a central portion of the body 110 and C2 is the content (at %) of Sn included in the internal electrodes 121 and 122 at a point 2 μm away from a point at which the internal electrode and the external electrode are in contact with each other in an inward direction of the body, wherein the content of Sn is based on the total amount of the components included in the internal electrodes. Accordingly, cracking incidence may be suppressed and capacitance and moisture resistance reliability may be improved.

If C2/C1 is 1 or less, Sn and Cu included in the external electrode may not sufficiently diffuse into the internal electrode, making it difficult to sufficiently form the Ni—Cu—Sn alloy at the end of the internal electrode, and in this case, the effect of improving moisture resistance reliability may be insufficient. Therefore, C2/C1 is preferably greater than 1, more preferably, 1.1 or more, and even more preferably, 1.4 or more. However, in order to further improve moisture resistance reliability, C2/C1 may be controlled to 3.7 or higher, and $3.7 \leq C2/C1 < 13.5$ may be satisfied. Further, in order to further improve moisture resistance reliability and further improve the capacitance, C2/C1 may be controlled to 7.0 or higher and $7.0 < C2/C1 < 13.5$ may be satisfied.

If C2/C1 is 13.5 or more, Sn and Cu included in the external electrode may be excessively diffused into the internal electrode, causing the internal electrode to expand, which may lead to radiation cracking incidence. Therefore, C2/C1 is preferably less than 13.5, more preferably, 12 or less, and even more preferably, 8.9 or less.

Each content of C1 and C2 may not be limited. In a specific example, C1 may be 0.1 to 1.0 at %, and C2 may be 1.0 to 20 at %.

If C1 is greater than 1.0 at %, internal electrodes may agglomerate due to Sn to degrade connectivity and grain growth of dielectric grains may be suppressed due to diffusion of Sn toward the dielectric.

If C2 is less than 1.0 at %, the effect of improving moisture resistance reliability based on the Ni—Cu—Sn alloy may be insufficient, and if C2 exceeds 20.0 at %, radiation cracking may occur.

A method of controlling C1, C2, and the ratio thereof is not limited. For example, C1, C2, and the ratio thereof may be controlled by adjusting the Sn content contained in the conductive paste for external electrodes and the conductive paste for internal electrodes, a firing temperature, a firing time, etc. For a more specific example, it is possible to manufacture a multilayer electronic component satisfying the numerical range of C2/C1 of the present disclosure by adjusting the content of Sn included in the conductive paste for external electrodes to a range of 3 wt % or more and 15 wt % or less.

FIG. 2B is a diagram explaining a measuring position of the atom % of the metals included in the internal electrode in the body of FIG. 2A. A point 2 μm away from a point at which the internal electrode and the external electrode, which is used for the measurement of C2, may correspond to a region having a length of 2 μm in an inward direction from a surface at which the internal electrodes 121 and the external electrodes 131 are in contact with each other (the third surface of the body) and a region having a length of 2 μm in an inward direction from a surface at which the internal electrodes 122 and the external electrodes 132 are in contact with each other (the fourth surface of the body). In addition, a central portion of the body 110, which is used for the measurement of C1, may correspond to a region centered on the body having a length of 2 μm in the length direction (X direction) of the body.

C1 and C2 may be values obtained by quadrisecting the capacitance forming portion A into four regions A1, A2, A3, and A4 in the Z direction, obtaining an average value of values measured from four internal electrodes per region, and averaging the average values of each region.

Here, when C1 and C2 are measured at each internal electrode, C1 may be a value measured at a point of the center of the internal electrode in the thickness direction, and C2 may be a value measured over the entire internal electrode area corresponding to the central 2 μm region.

The Cu atom included in the Ni—Cu—Sn alloy included in the internal electrodes 121 and 122 may be derived from the Cu atom included in the conductive paste for external electrodes, diffused to the internal electrodes 121 and 122 during firing, and a part of Sn of the Ni—Cu—Sn alloy may be Sn, included in the conductive paste for electrodes, diffused to the internal electrodes 121 and 122 during firing.

Accordingly, at % of Sn and Cu of the Ni—Cu—Sn alloy included in the internal electrodes 121 and 122 may gradually decrease at the point at which the internal electrode and the external electrode are in contact with each other in the inward direction of the body. Conversely, at % of Ni may gradually increase at a point at which the internal electrode and the external electrode are in contact with each other in the inward direction of the body.

That is, the concentrations (atom %) of Cu and Sn may gradually decreases in the inward direction of the body, and the concentration (atom %) of Ni may gradually increases in the inward direction of the body.

In the case of Sn contained in the internal electrode, the concentration of Sn gradually decreases from a point at which the internal electrode and the external electrode are in contact with each other toward the center of the body, and a certain concentration may then be maintained at a certain point. This is because Sn contained in the internal electrode may include not only Sn included in the conductive paste for external electrodes and diffused, but also Sn present in the conductive paste used for forming the internal electrodes.

For a specific example, the Sn concentration (atom %) of the internal electrodes 121 and 122 may gradually decrease from the point at which the internal electrode and the external electrode are in contact with each other to a point having a distance of 5 to 15 μm from the point at which the internal electrode and the external electrode in the inward direction of the body, and a constant concentration (atom %) may then be maintained.

In this case, a length of a region in which the Sn content is 5 at % or more in the internal electrodes 121 and 122 may be 5 μm or more and 10 μm or less in the inward direction of the body from the point at which the internal electrode and the external electrode are in contact with each other.

If the length of the region in which the Sn content is 5 at % or more is less than 5 μm from the point at which the internal electrode and the external electrode are in contact with each other in the inward direction of the body, the effect of improving moisture resistance reliability may be insufficient, and if the length of the region exceeds 10 μm, radial cracking incidence may occur.

In the case of Cu contained in the internal electrodes 121 and 122, the concentration (atom %) of Cu may gradually decrease in the inward direction of the body from the point at which the internal electrodes 121 and 122 and the external electrodes 131 and 132 are in contact with each other so as to converge to zero (0). Cu included in the internal electrodes 121 and 122 is derived from Cu included in and diffused from the conductive paste used for forming the external electrodes, and the conductive paste used for forming the internal electrodes may not include Cu.

For some embodiments, the Cu concentration (atom %) of the internal electrodes 121 and 122 may gradually decrease from the point at which the internal electrode and the external electrode are in contact with each other to a point of 5 to 15 μm in the inward direction of the body and then reduce to zero.

In this case, a length of a region in which the Cu content is 10 at % or more in the internal electrodes 121 and 122 may be 5 μm or more and 10 μm or less in the inward direction of the body from the point at which the internal electrode and the external electrode are in contact with each other.

If the length of the region in which the Cu content is 10 at % or more is less than 5 μm from the point at which the internal electrode and the external electrode are in contact with each other in the inward direction of the body, the effect of improving moisture resistance reliability may be insufficient, and if the length of the region exceeds 10 μm, radial cracking may occur.

The internal electrodes 121 and 122 may be formed by printing a conductive paste for internal electrodes containing Ni and Sn on a ceramic green sheet.

In addition, the conductive paste for internal electrodes may further include at least one of palladium (Pd), silver (Ag), gold (Au), platinum (Pt), tungsten (W), titanium (Ti), and alloys thereof, and accordingly, the internal electrode may further include at least one of palladium (Pd), silver (Ag), gold (Au), platinum (Pt), tungsten (W), titanium (Ti), and alloys thereof.

The printing method of the conductive paste for internal electrodes may be a screen-printing method or a gravure printing method, and the present disclosure is not limited thereto.

Meanwhile, a thickness to of the internal electrodes 121 and 122 may not need to be limited.

However, in general, if the internal electrodes 121 and 122 are formed to have a thickness less than 0.6 μm, in particular, if the thickness of the internal electrodes 121 and 122 is 0.41 μm or less, moisture resistance reliability may be deteriorated.

As described below, when the Sn content of each position of the internal electrode is controlled according to an exemplary embodiment, moisture resistance reliability may be improved by including the alloy including Ni, Cu, and Sn in the region in which the internal electrodes 121 and 122 and the external electrodes 131 and 132 are in contact with each other, so that sufficient moisture resistance reliability may be ensured even when the thickness of the dielectric layer is 0.41 μm or less.

Accordingly, when the thickness of the internal electrodes 121 and 122 is 0.41 μm or less, the effect of improving moisture resistance reliability according to the present disclosure may be more remarkable and miniaturization and high capacitance of the capacitor component may be more easily achieved.

The thickness to of the internal electrodes 121 and 122 may refer to an average thickness of the internal electrodes 121 and 122.

The average thickness of the internal electrodes 121 and 122 may be measured by scanning an image of a cross-section of the body 110 in the length-thickness direction (L-T) with a scanning electron microscope (SEM).

For example, regarding certain first and second internal electrodes 121 and 122 extracted from an image of the length-thickness (L-T) directional cross-section taken at a central portion of the body 100 in the width direction with the SEM, thicknesses thereof may be measured at 30 points at equal intervals in the length direction, and an average value thereof may be calculated.

The external electrodes 131 and 132 are disposed on the body 110 and are connected to the internal electrodes 121 and 122.

As shown in FIG. 2A, the external electrodes 131 and 132 may include first and second external electrodes 131 and 132 disposed on the third and fourth surfaces 3 and 4 and connected to the first and second internal electrodes 121 and 122, respectively.

In this exemplary embodiment, a structure in which the multilayer electronic component 100 has two external electrodes 131 and 132 is described, but the number or shape of the external electrodes 131 and 132 may be changed according to shapes of the internal electrodes 121 and 122 or other purposes.

The external electrodes 131 and 132 include Cu and Sn.

Cu basically serves to secure electrical connectivity with the internal electrode, and Sn may lower a firing temperature to control diffusion of Cu.

Meanwhile, the external electrodes 131 and 132 may include an alloy including Ni, Cu, and Sn in a region thereof in contact with the internal electrode.

As described above, the diffusion coefficient of Cu is about 100 times greater than that of Ni at 660° C. to 730° C., and diffusion from Cu to Ni is mainly due to the difference in the diffusion coefficient. Here, since Ni of the internal electrodes 121 and 122 may also diffuse to a portion of the external electrodes, the external electrodes 131 and 132 may also include an alloy including Ni, Cu, and Sn in the region in contact with the internal electrodes 121 and 122.

The external electrodes 131 and 132 may be formed using a conductive paste for external electrodes including Cu and Sn. In addition, the conductive paste for external electrodes may include glass, and the external electrodes 131 and 132 may be firing-type electrodes. That is, the external electrodes 131 and 132 may be formed by applying the conductive paste for external electrodes to the body 110 and firing the conductive paste.

In addition, the conductive paste for external electrodes may additionally include at least one of palladium (Pd), silver (Ag), gold (Au), platinum (Pt), tungsten (W), titanium (Ti), and alloys thereof. Accordingly, the external electrodes 131 and 132 may additionally include at least one of palladium (Pd), silver (Ag), gold (Au), platinum (Pt), tungsten (W), titanium (Ti), and alloys thereof.

Furthermore, the external electrodes 131 and 132 may have a multilayer structure.

For example, the external electrodes 131 and 132 may include electrode layers 131a and 132a disposed on the body 110 and plating layers 131b and 132b formed on the electrode layers 131a and 132a. Here, the electrode layers 131a and 132a may refer to the aforementioned external electrodes.

In addition, a conductive resin layer including a conductive metal and a resin may be additionally disposed between the electrode layers 131a and 132a and the plating layers 131b and 132b.

The plating layers 131b and 132b serve to improve mounting characteristics. The plating layers 131b and 132b are not limited in type and may be plating layers including at least one of Ni, Sn, Pd, and alloys thereof or may be formed of a plurality of layers.

For a more specific example of the plating layers 131b and 132b, the plating layers 131b and 132b may include a Ni plating layer or an Sn plating layer, and in this case, the Ni plating layer and the Sn plating layer may be sequentially formed on the electrode layers 131a and 132a or the Sn plating layer, the Ni plating layer, and the Sn plating layer may be sequentially formed on the electrode layers 131a and 132a. In addition, the plating layers 131b and 132b may include a plurality of Ni plating layers and/or a plurality of Sn plating layers.

A size of the multilayer electronic component 100 may not be particularly limited.

However, in order to achieve both miniaturization and high capacitance, the number of layers needs to be increased by reducing the thickness of the dielectric layer and the internal electrode, and thus, the effect of improving reliability and insulation resistance according to the present embodiment may be remarkable in a multilayer electronic component having a 0402 size (length×width, 0.4 mm×0.2 mm) or less.

Accordingly, when a distance between the third and fourth surfaces of the body is defined as L and a distance between the fifth and sixth surfaces is defined as W, L may be 0.4 mm or less and W may be 0.2 mm or less. That is, the multilayer electronic component may have the 0402 size (length×width, 0.4 mm×0.2 mm) or less.

Hereinafter, a multilayer electronic component according to another exemplary embodiment will be described in detail. However, since the same drawings as those in the exemplary embodiment described above may be applied and the same reference numerals may be applied, and thus the multilayer electronic component will be described with reference to FIGS. 1 to 6. In addition, in order to avoid redundant descriptions, contents overlapping with that of the multilayer electronic component according to the exemplary embodiment in the present disclosure described above will be omitted.

A multilayer electronic component 100 according to another exemplary embodiment in the present disclosure includes: a body in which internal electrodes including Ni and Sn and dielectric layers are alternately disposed; and external electrodes disposed on a surface of the body, connected to the internal electrodes, and including Cu and Sn, wherein the internal electrodes include an alloy including Ni, Cu, and Sn in a region thereof in contact with the external electrodes, and a length of a region of the internal electrode in which Sn is 5 at % or more is 5 μm to 10 μm from the point at which the internal electrode and the external electrode are in contact with each other in an inward direction of the body.

If the length of the region in which the Sn content is 5 at % or more is less than 5 μm from the point at which the internal electrode and the external electrode are in contact with each other in the inward direction of the body, the alloy is insufficiently formed at one end of the internal electrode so the effect of improving moisture resistance reliability may be insufficient, and if the length of the region exceeds 10 μm, the alloy is excessively formed at one end of the internal electrode to increase the thickness to thereby cause a radial cracking incidence.

Here, in the internal electrodes 121 and 122, the Sn content may gradually decrease from the point thereof in contact with the external electrodes 131 and 132 to the point at which the Sn content is 5 at %. This is because the internal electrodes 121 and 122 may include Sn diffused from the external electrodes 131 and 132.

In addition, in the internal electrodes 121 and 122, a length of a region in which a Cu content is 10 at % or more may be 5 μm or more and 10 μm or less in the inward direction of the body from the point at which the internal electrode and the external electrode are in contact with each other.

If the length of the region in which the Cu content is 10 at % or more is less than 5 μm from the point at which the internal electrode and the external electrode are in contact with each other in the inward direction of the body, the effect of improving moisture resistance reliability may be insufficient, and if the length of the region exceeds 10 μm, radial cracking incidence may occur.

Here, in the internal electrodes 121 and 122, the Cu content may gradually decrease from the point thereof in contact with the external electrodes 131 and 132 to the point at which the Cu content is 10 at %. This is because the internal electrodes 121 and 122 may include Sn diffused from the external electrodes 131 and 132.

Example 1

Figure 5A:
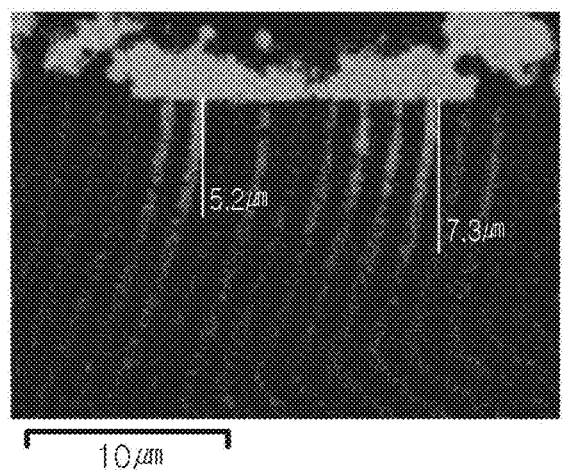
FIGS. 5A and 5B are images of (a) Cu element and (b) Ni element, respectively, observed in a region in which an internal electrode is in contact with an external electrode using an SEM-EDX when the external electrode is formed using an external electrode conductive paste to which Sn is not added.
Figure 5B:
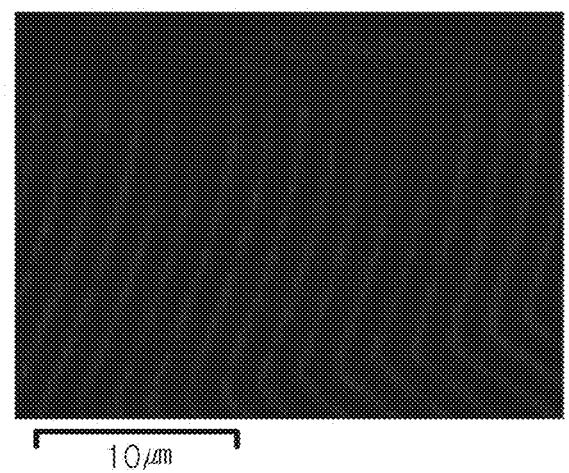

FIGS. 5A and 5B are images of (a) Cu element and (b) Ni element, respectively, observed in a region in which an internal electrode is in contact with an external electrode using an SEM-EDX when the external electrode is formed using an external electrode conductive paste to which Sn is not added.

Figures 6A, 6B, 6C:
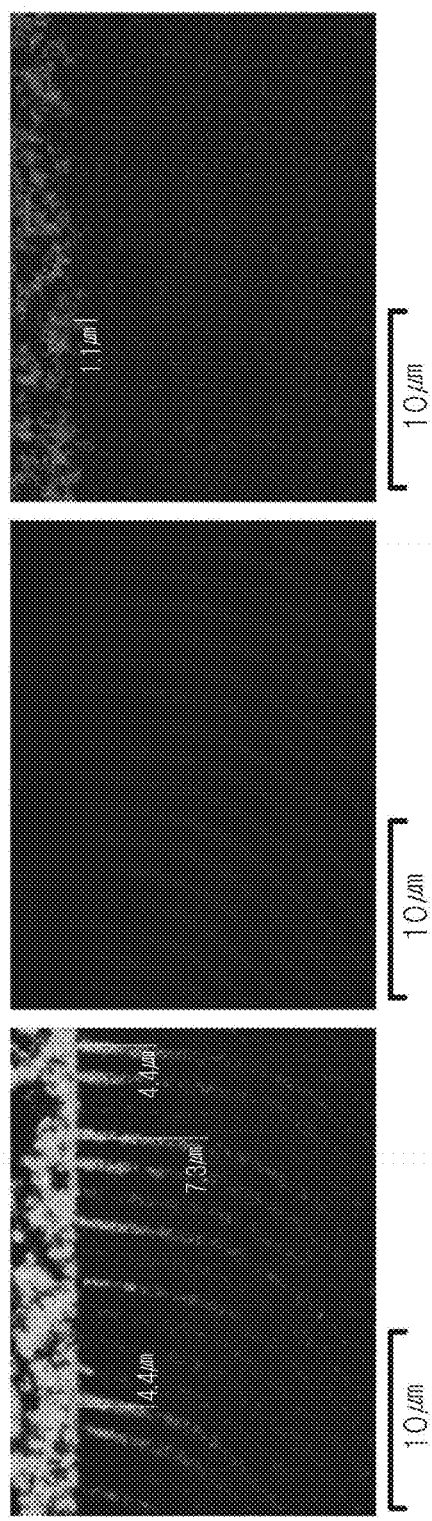
FIGS. 6A, 6B and 6C are images of (a) Cu element, (b) Ni element, and (c) Sn element, respectively, observed in a region in which an internal electrode is in contact with an external electrode using an SEM-EDX when the external electrode is formed using an external electrode conductive paste to which 5 wt % of Sn is added.

FIGS. 6A, 6B and 6C are images of (a) Cu element, (b) Ni element, and (c) Sn element, respectively, observed in a region in which an internal electrode is in contact with an external electrode using an SEM-EDX when the external electrode is formed using an external electrode conductive paste to which 5 wt % of Sn is added.

FIGS. 7A, 7B and 7C are images of (a) Cu element, (b) Ni element, and (c) Sn element, respectively, observed in a region in which an internal electrode is in contact with an external electrode using an SEM-EDX when the external electrode is formed using an external electrode conductive paste to which 10 wt % of Sn is added.

As measurement equipment, a Q-SEM by ZEISS and an EDX by OXFORD were used, and ends of internal electrodes of a cross-section (L-T cross-section) taken in the length-thickness direction at the center of a sample chip in the width direction were observed in an ESD mapping mode.

Comparing FIGS. 5 and 6, it can be seen that Cu diffusion occurs more readily when Sn is added. However, it can be seen that a difference in Cu diffusion is not significant.

Meanwhile, in FIG. 7, it can be seen that Sn of the external electrode was significantly diffused toward the internal electrodes and a diffusion length of Cu is also longer compared to FIGS. 5 and 6.

Accordingly, it can be seen that the length of the alloy including Ni, Cu, and Sn disposed at the ends of the internal electrodes may be controlled by controlling the Sn content contained in the conductive paste for external electrodes.

Example 2

Sample chips satisfying the Sn content ratio of Table 1 below were prepared by controlling the Sn content included in a conductive paste for external electrodes, and firing conditions, etc. For Test Nos. 1 to 5, a conductive paste for external electrodes to which 5 wt % of Sn was added was used, and for Test Nos. 6 to 10, a conductive paste for external electrodes to which 10 wt % of Sn was added was used.

Referring to the Sn content ratio in the internal electrodes 121 and 122 in Table 1, C2/C1 in which C1 is the Sn content at a central portion of the body 110 and C2 is the Sn content at a point of 2 μm away from a point at which the internal electrodes and the external electrodes are in contact with each other in an inward direction of the body.

Further, referring to FIG. 2B, a point of 2 μm away from the point at which the internal electrodes 121 and 122 and the external electrodes 131 and 132 are in contact with each other in the inward direction of the body 110 may be a point spaced apart from the third surface by 2 μm in the case of the first internal electrode and may be a point spaced apart from the fourth surface by 2 μm in the case of the second internal electrode. Also, the central portion of the body 110 is a certain point in the central 10 μm region in the length direction (X direction) of the body.

C1 and C2 shown in Table 1 were obtained by quadrisecting the capacitance forming portion A into four regions A1, A2, A3, and A4 in the Z direction and obtaining an average value of values measured from four internal electrodes per region, and averaging the values of each region.

For each of the sample chips of Test Nos, capacitance, the presence or absence of radial cracks, and moisture resistance reliability were evaluated and are shown in Table 1 below.

Radial cracking was observed from a length-thickness directional cross-section taken at a width-directional central portion of the body with an optical microscope (Olympus BX53M ×100).

Moisture resistance reliability was checked by measuring time until an insulation resistance value is reduced to 1/10 or less, compared with an initial numerical value thereof, by applying 4V to each sample chip at a temperature of 85° C. and relative humidity of 85%.

TABLE 1

| Test No. | Sn content ratio (C2/C1) | | | | | Capacitance (nF) | Radial crack | Moisture resistance reliability (time) |
| --- | --- | --- | --- | --- | --- | --- | --- | --- |
| | A1 | A2 | A3 | A4 | Average | | | |
| 1 | 1.4 | 1.7 | 1.6 | 1.1 | 1.5 | 443.2 | x | 68 |
| 2 | 1.2 | 1.8 | 1.3 | 1.4 | 1.4 | 441.5 | x | 76 |
| 3 | 3.7 | 4.2 | 2.8 | 4.1 | 3.7 | 439.8 | x | 94 |
| 4 | 3.3 | 3.9 | 3.4 | 3.3 | 3.5 | 457.6 | x | 98 |
| 5 | 4.8 | 5.7 | 6.3 | 6.4 | 5.8 | 452.4 | x | 97 |
| 6 | 7.4 | 5.9 | 6.8 | 7.7 | 7.0 | 491.5 | x | 123 |
| 7 | 9.7 | 9.1 | 8.4 | 8.4 | 8.9 | 485.4 | x | 125 |
| 8* | 12.6 | 13.8 | 12.7 | 14.8 | 13.5 | 485.3 | ○ | 48 |
| 9* | 13.7 | 16.4 | 17.1 | 14.7 | 15.5 | 501.1 | ○ | 43 |
| 10* | 18.4 | 18.3 | 16.3 | 19.4 | 18.1 | 497.4 | ○ | 37 |

In the case of Test Nos. 1 to 7 satisfying 1<C2/C1<13.5 presented in the present disclosure, it can be seen that no radial cracking occurred and moisture resistance reliability was also excellent.

Meanwhile, in the case of Test Nos. 8 to 10 in which C2/C1 is 13.5 or more, it can be seen that radial cracking was observed and moisture resistance reliability was also measured to be less than 50 hours, showing inferiority.

Meanwhile, it can be seen that, among Test Nos. 1 to 7, Test Nos. 3 to 7 having C2/C1 of 3.7 or more have better moisture resistance reliability.

In addition, it can be seen that, among Test Nos. 1 to 7, Test Nos. 6 and 7 having C2/C1 of 7.0 or more have even better moisture resistance reliability and higher capacitance.

Figure 8:
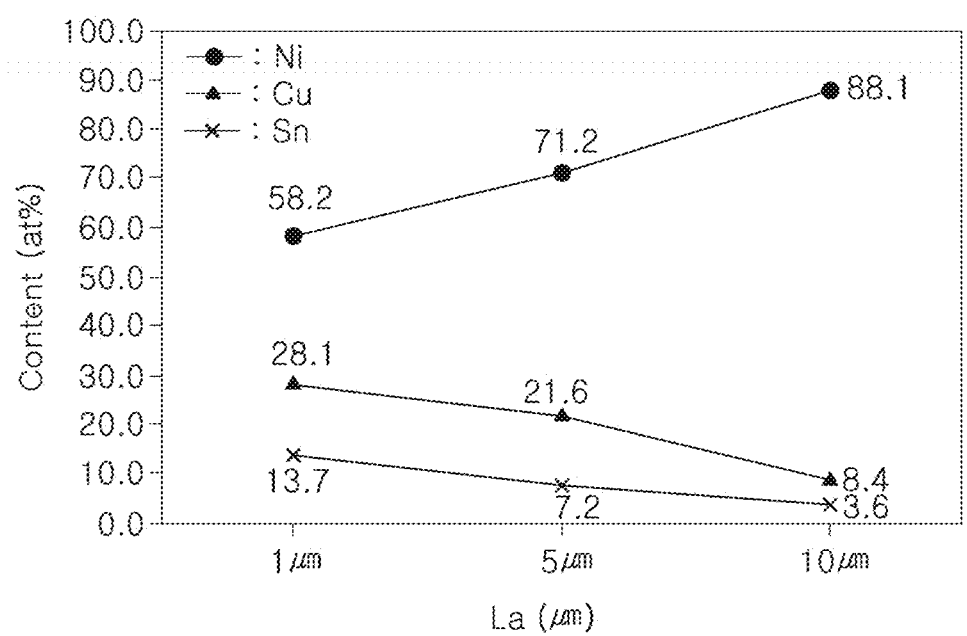
FIG. 8 is a graph illustrating atomic % of Cu, Ni, and Sn elements according to distances in an inward direction of a body from a point at which an internal electrode and an external electrode are in contact with each other, regarding the internal electrode of a multilayer electronic component according to an exemplary embodiment in the present disclosure.

FIG. 8 shows a measurement of the atomic percentage of Ni, Cu, and Sn of the internal electrode according to distances in an inward direction of the body from the point at which the internal electrode and the external electrode are in contact with each other, for Test No. 7.

It can be seen that the atomic percentage of Cu and Sn of the internal electrode decreases and the atomic ratio of Ni increases as the distance in the inward direction of the body from the point at which the internal electrode and the external electrode are in contact with each other increases.

As set forth above, according to exemplary embodiments in the present disclosure, one of the various effects of the present disclosure is to improve moisture resistance reliability by including the alloy including Ni, Cu, and Sn disposed in a region in which the internal electrode is in contact with the external electrode.

In addition, one of the various effects of the present disclosure is to suppress cracking incidence.

In addition, one of the various effects of the present disclosure is to improve the capacitance.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body in which internal electrodes including Ni and Sn and dielectric layers are alternately disposed; and
external electrodes disposed on a surface of the body, connected to the internal electrodes, and including Cu and Sn,
wherein the internal electrodes include an alloy including nickel (Ni), copper (Cu), and tin (Sn) in a region in contact with the external electrodes, and Sn in an amount that satisfies the following formula: $1<C2/C1<13.5$ in which C1 is a content (at %) of Sn included in the internal electrodes at a central portion of the body and C2 is a content (at %) of Sn of the internal electrodes at a point 2 μm away from a point at which the internal electrodes and the external electrodes are in contact with each other in an inward direction of the body, wherein the content of Sn is based on a total amount of the components included in the internal electrodes.

2. The multilayer electronic component of claim 1, wherein
C2/C1 is 3.7 or more and less than 13.5.

3. The multilayer electronic component of claim 2, wherein
C2/C1 is 7.0 or more and less than 13.5.

4. The multilayer electronic component of claim 1, wherein
C2/C1 is greater than 1 and 8.9 or less.

5. The multilayer electronic component of claim 4, wherein
C2/C1 is 1.4 or more and 8.9 or less.

6. The multilayer electronic component of claim 5, wherein
C2/C1 is 3.7 or more and 8.9 or less.

7. The multilayer electronic component of claim 6, wherein
C2/C1 is 7.0 or more and 8.9 or less.

8. The multilayer electronic component of claim 1, wherein
C1 is 0.1 to 1.0 at %, and C2 is 1.0 to 20.0 at %.

9. The multilayer electronic component of claim 1, wherein
an atomic percentage (at %) of each of Sn and Cu gradually decreases in an inward direction of the body from the point at which the internal electrodes and the external electrodes are in contact with each other.

10. The multilayer electronic component of claim 1, wherein
the internal electrode includes 5 at % or more of Sn in a region having a distance of 5 μm or more and 10 μm or less from the point at which the internal electrodes and the external electrodes are in contact with each other in the inward direction of the body.

11. The multilayer electronic component of claim 1, wherein
the internal electrode includes 10 at % or more of Cu in a region having a distance of 5 μm or more and 10 μm or less from the point at which the internal electrodes and the external electrodes are in contact with each other in the inward direction of the body.

12. The multilayer electronic component of claim 1, wherein
the internal electrodes further include at least one of palladium (Pd), silver (Ag), gold (Au), platinum (Pt), tungsten (W), titanium (Ti), or alloys thereof.

13. The multilayer electronic component of claim 1, wherein
the external electrodes include an alloy including Ni, Cu, and Sn in a region in contact with the internal electrodes.

14. The multilayer electronic component of claim 1, wherein
the external electrodes further include glass.

15. The multilayer electronic component of claim 1, wherein
the external electrodes further include at least one of palladium (Pd), silver (Ag), gold (Au), platinum (Pt), tungsten (W), titanium (Ti), or alloys thereof.

16. The multilayer electronic component of claim 1, wherein
an average thickness of the internal electrodes is 0.41 μm or less.

17. The multilayer electronic component of claim 1, wherein
an average thickness of the dielectric layer is 0.41 μm or less.

18. A multilayer electronic component comprising:
a body in which internal electrodes including Ni and Sn and dielectric layers are alternately disposed; and
external electrodes disposed on a surface of the body, connected to the internal electrodes, and including Cu and Sn,
wherein the internal electrodes include: an alloy including Ni, Cu, and Sn in a region in contact with the external electrodes; and 5 at % or more of Sn in a region having a distance of 5 μm or more and 10 μm or less from a point at which the internal electrodes and the external electrodes are in contact with each other in an inward direction of the body.

19. The multilayer electronic component of claim 18, wherein
a Sn content in the internal electrodes gradually decreases from a point in contact with the external electrodes to a point at which the Sn content is 5 at %.

20. The multilayer electronic component of claim 18, wherein
the internal electrodes include 10 at % or more of Cu in a region having a distance of 5 μm or more and 10 μm or less from the point at which the internal electrodes and the external electrodes are in contact with each other in the inward direction of the body.

21. The multilayer electronic component of claim 18, wherein
a Cu content in the internal electrodes gradually decreases from the point in contact with the external electrodes to a point at which the Cu content is 10 at %.

22. The multilayer electronic component of claim 18, wherein
the external electrodes include an alloy including Ni, Cu, and Sn in the region in contact with the internal electrodes.

23. A multilayer electronic component comprising:
a body in which internal electrodes and dielectric layers are alternately disposed; and
external electrodes disposed on a surface of the body, connected to the internal electrodes, and including Cu and Sn,
wherein the internal electrodes include an alloy including copper (Cu) and tin (Sn), and
an atomic percentage (at %) of each of Sn and Cu gradually decreases in an inward direction of the body from a point at which the internal electrodes and the external electrodes are in contact with each other.

24. The multilayer electronic component of claim 23, wherein an atomic percentage (at %) of Sn in the internal electrode is 5 at % or more in a region having a distance of 5 μm or more and 10 μm or less from the point at which the internal electrodes and the external electrodes are in contact with each other in the inward direction of the body.

25. The multilayer electronic component of claim 23, wherein an atomic percentage (at %) of Cu in the internal electrode is 10 at % or more in a region having a distance of 5 μm or more and 10 μm or less from the point at which the internal electrodes and the external electrodes are in contact with each other in the inward direction of the body.

\* \* \* \* \*